Figure 1:
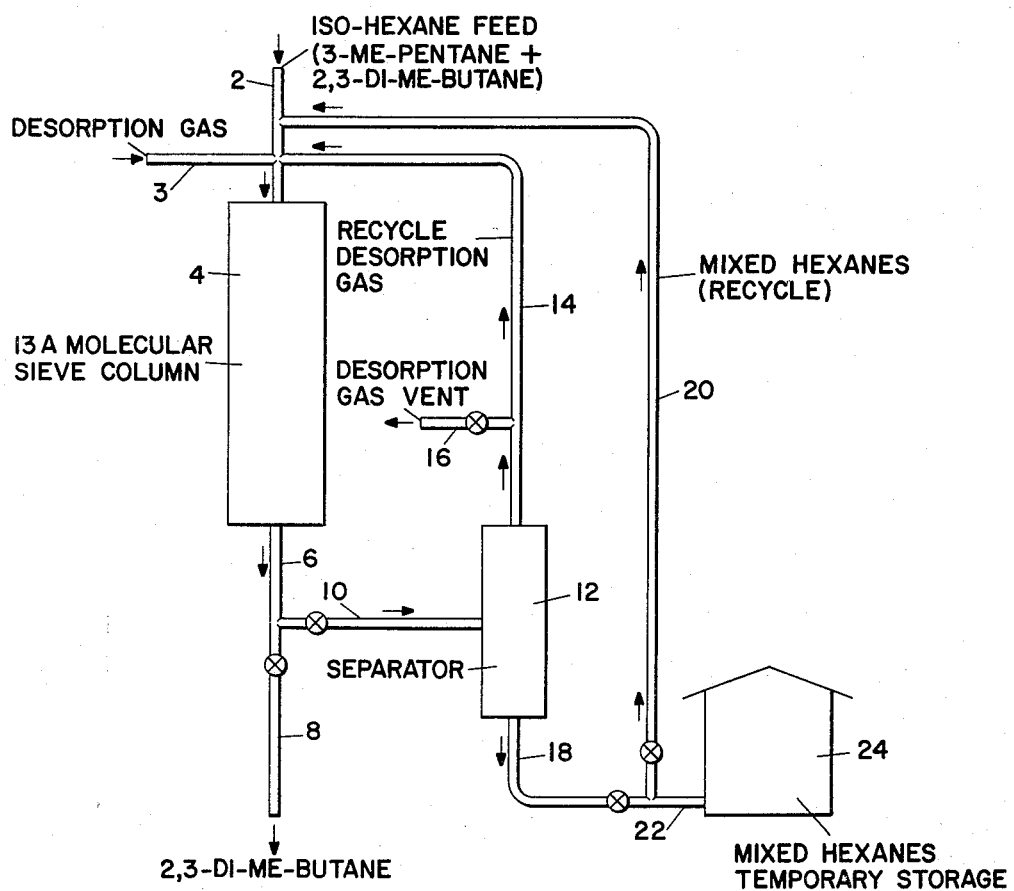

United States Patent Office 2,956,089
Patented Oct. 11, 1960

2,956,089

SEPARATION OF ISOPARAFFINS DIFFERING IN DEGREE OF BRANCHING WITH ZEOLITIC MOLECULAR SIEVES

William Judson Mattox and Charles Newton Kimberlin, Jr., Baton Rouge, La., assignors to Esso Research and Engineering Company, a corporation of Delaware Filed Nov. 12, 1957, Ser. No. 695,843

10 Claims. (Cl. 260—676)

The present invention relates to a process for separating hydrocarbons from their mixtures with one another, and more particularly, to the separation of hydrocarbons which are difficult to separate by distillation because of their similarity of boiling points or their azeotroping characteristics. Still more particularly, the present invention relates to the separation of hydrocarbons from their mixtures with certain natural or synthetic crystalline zeolites having pore openings of uniform diameter of about 6 to 15 Angstrom units.

It has long been known that certain porous substances, such as silica gel, activated char, and indeed zeolites have certain selective adsorption characteristics useful in resolving a hydrocarbon mixture into its components. Thus silica gel is selective to removing aromatic hydrocarbons from non-aromatic hydrocarbons, and activated chars are useful in separating olefins from mixtures with paraffins. Similarly, certain crystalline zeolites having pore openings of about 5 Angstroms, and known as molecular sieves, have the capacity of adsorbing and thus separating straight chain from branch chain and cyclic hydrocarbons. The mineral chabazite is such a zeolite; branch chain hydrocarbons have a molecular diameter greater than 5 Angstroms and are thus not able to get into the pores.*

There are many separations, however, that these solid, porous adsorbents are not capable of making efficiently. Thus it would be highly desirable to separate singly branched from doubly branched chain hydrocarbons, particularly in the $C_5$–$C_6$ range. In the present high octane requirements for modern high compression engines, an important petroleum refining step is isomerizing normal pentane and hexane, which are the principal constituents of light virgin naphtha. Isomerization by a Friedel-Crafts catalyst converts, for instance, low octane n-hexane to a mixture of methyl pentanes and dimethyl butane. Though the methyl pentanes have a higher octane rating than the normal hexane, they are, in turn, much lower than dimethylbutane. This fact requires that the product from the isomerization unit be fractionated and that the methyl pentanes be recycled. Since the boiling point of these products are very close, elaborate superfractionation equipment is required.

Similarly, in certain petrochemical processes it is necessary to separate close boiling fractions prior to subjecting one of these fractions to further processing. Thus, in the preparation of adipic acid from cyclohexane by oxidation, it is necessary to separate the cyclohexane from close boiling isoparaffins also present in the straight run naphtha. Here again, superfractionation is normally required; cyclohexane boils at 177° F. while the dimethyl pentanes boil at 175° to 179° F.

It is thus an object of the present invention to provide a highly efficient process for separating close boiling hydrocarbons without the necessity of superfractionation.

It is a still further object of the present invention to employ a selective adsorbent to separate close boiling cyclic and branch chain hydrocarbons, and singly branched from more highly branched hydrocarbons.

Other and further objects and advantages of the present invention will become more clear hereinafter.

In accordance with the present invention there is employed as a selective hydrocarbon separation agent a metal salt of a crystalline alumino-silicate having pore openings of uniform size, of from about 6 to 15 Angstroms. These materials may readily be prepared by mixing and heating sodium aluminate and sodium silicate, preferably sodium metasilicate under carefully controlled conditions of temperatures, concentrations, and alkalinity, to produce a crystalline product which is subsequently dehydrated under conditions to preserve the crystalline structure. If desired, the sodium content of the alumino-silicate may thereafter be replaced at least in part by effecting ion exchange with an appropriate metal salt, such as magnesium, calcium, zinc, chromium, iron, cadmium, and the like. The base exchange, however, is not necessary.

The preparation of the separating agent involves the maintenance of several critical steps. These are (1) the ratio of soda to silica, (2) the reaction temperature, (3) the pH of the solution from which the sodium alumino-silicate is crystallized, and (4) the ratio of silica to alumina. Unless these critical conditions are observed, the resulting composition will either not be crystalline, or it will have little or no adsorptive properties, the pores will not be uniform, or the pores, if uniform, will be too small to admit any but small diameter molecules. If the conditions are observed, the pores will be large enough to admit most organic molecules, and will be between 6 and 15 Angstroms.

The ratio of $Na_2O/SiO_2$ in the silicate employed must be at least 0.5:1, but may be as high as 2:1. Preferably, the ratio is 0.7:1 to 1:1, and the desired reagent is sodium metasilicate. If water glass is employed, additional caustic must be present.

The composition of the sodium aluminate is less critical. Sodium aluminates having any ratio of soda to alumina in the range of 1:1 to 3:1 may be employed; however, a sodium aluminate having a high ratio of soda to alumina is preferred, and a sodium aluminate having the ratio of about 1.5:1 $Na_2O/Al_2O_3$ is particularly desirable. The amounts of sodium silicate solution and sodium aluminate solution are such that the mol ratio of silica to alumina in the final mixture is at least 2.2:1, and preferably 2.5–4:1. However, silica to alumina ratios as high as 10:1 may be employed.

The method of mixing the sodium metasilicate and sodium aluminate solutions must be carried out in a manner allowing formation of a precipitate having a uniform composition. A good method is to add the aluminate to the silicate at ambient temperatures using rapid and efficient agitation to make a homogeneous paste. Thereafter, the mixture is heated to about 180° to 215° F. for a period up to 200 hours or more to ensure crystallization in the form having interstices large enough to adsorb isoparaffinic and aromatic molecules. The heat-soaking step is essential; however, heating at temperatures of about 350° F. and higher does not produce a crystalline composition having the desired uniform size pore openings.

A general scheme for preparing the zeolite is as follows: A solution of sodium metasilicate is prepared, having a concentration of 30 to 300 grams, preferably 100 to 200 grams per liter. Similarly, a solution of sodium aluminate having an $Al_2O_3$ concentration of 40 to 400 grams, preferably 200 to 300 grams, is prepared. The

* An article by R. M. Barrer "Molecular Sieve Action of Solids" appearing in Quarterly Reviews, vol. III, pages 293–320 (1949), and published by the Chemical Society (London) describes these materials well.

amounts of metasilicate and aluminate solutions employed are such that the ratio of $SiO_2/Al_2O_3$ in the final mixture is 2.2:1 to 10:1, preferably 2.5:1 to 4:1. The solutions are mixed, preferably at ambient temperatures. The slurry is of such concentration that the pH is above 12. Considering the amount of sodium atoms present in the total composite, the total volume of slurry should be adjusted so that each liter of composite slurry contains about 2 to 6 equivalents of sodium, preferably about 3 to 5 equivalents of sodium. The resulting slurry is heated from 180° to 250° F., but below 300° F., for a period of time depending on the temperature. At 210° F., this is about 3 to 24 hours, and shorter at higher temperatures, although long heating times may be employed without producing any deleterious effects.

If desired, the crystalline product resulting from the heat-treating step may be reacted with the salt of a metal of the type previously enumerated, though the sodium form itself may be employed. In the latter case, the crystalline material is water-washed, filtered, and heat activated by calcination at 400° to 1000° F., preferably about 700° to 900° F. The crystalline sodium aluminosilicate formed during the heat soaking period has the stoichiometric composition of $Na_2O.Al_2O_3.2.7SiO_2$. The sodium crystals may be reacted with metal salt solutions that enhance the selective adsorptive behavior under certain circumstances. These metals are of the type already enumerated, and may further include cobalt, nickel, copper, silver, gold, platinum, the rare earths, cadmium, mercury, lead, and the like.

The process of the present invention may be understood more clearly when read in conjunction with Figure 1, which is a flow plan of a preferred embodiment of the invention depicting, as an example, the separation of 3-methyl pentane from 2,3-dimethyl butane. These two compositions are produced in the isomerization of normal hexane.

Turning now to Figure 1, the stream from the isomerization unit is passed via line 2 to adsorption zone 4. This is a tower containing the zeolites described above. Preferably, the feed is in the vaporized form. The adsorbent may be arranged in trays, or packed in supports or be unsupported. Though, as will be shown below, the conditions for most efficient separations vary in accordance with the constituents of the mixture, in general, conditions within tower 4 include flow rates of 0.1 to 10 w./hr./w., temperatures of 150° to 500° F., and pressures of atmospheric to 200 p.s.i.g. A product stream consisting essentially of pure dimethyl butane is withdrawn through lines 6 and 8, while the adsorbed material contains methyl pentanes in substantially higher concentrates than this product is present in the feed.

When the singly-branched isomer appears in the effluent, or as soon thereafter as desirable, depending upon the purity required, the flow of feed through line 2 is halted and the desorption cycle begins. This may be carried out in any number of conventional ways, such as lowering the pressure or raising the temperature, employing a purge gas, employing an olefin such as propylene to replace the adsorbed paraffins, and the like. Thus, hot methane or hydrogen may be passed through lines 3 and 2 into vessel 4 at a temperature of about 300° to 750° F. to strip adsorbate, which is separated from the purge gas stream in cooler-separator 12. Recycle gas is circulated via line 14 while product is passed to temporary storage zone 24. The product is a mixture consisting of 3-methyl pentane and dimethyl butane; however, the proportion of the methyl pentane in the mixture is substantially higher than in the feed.

When the purging is complete, the adsorption cycle is repeated. It is customarily desirable to build up a sufficient inventory in vessel 24 before passing this material through lines 22 and 20 back to the adsorption zone. However, the process can be made continuous by employing two or more adsorption columns simultaneously. The final product thus is substantially pure dimethyl butane, an extremely high octane blending agent, and substantially pure methyl pentanes which are recycled to isomerization for further conversion.

The process of the present invention may be further illustrated by the specific examples below.

EXAMPLE 1

A vaporized mixture consisting of 50% 2,2-dimethyl butane and 50% 2-methyl pentane was passed over a fixed bed of a crystalline sodium alumino silicate adsorbent having a uniform pore diameter of 13 Angstroms at atmospheric pressure and a series of temperatures between 140° and 400° F. At the intermediate temperatures of 150° to 245° F., the effluent was 100% 2,2-dimethyl butane.

| Adsorption Temp., ° F. | 140 | 155 | 175 | 245 | 400 |
|---|---|---|---|---|---|
| Feed, cc./100 g. Adsorbent | 24 | 28 | 27 | 21.5 | 21 |
| Composition | 50% 2,2-Dimethyl Butane, 50% 2-Methyl Pentane | | | | |
| Unadsorbed Fraction, cc./100 g. Adsorbent | 0 | 8 | 7.5 | 4.6 | <0.05 |
| Composition | 100% 2,2-Dimethyl Butane | | | | |
| Adsorbed Fraction, cc./100 g. Adsorbent | | 20 | 19.5 | 16.9 | |
| Composition: | | | | | |
| 2,2-Dimethyl Butane, percent | | 30 | 31 | 36 | |
| 2-Methyl Pentane, percent | | 70 | 69 | 64 | |
| Recovery of Dimethyl Butane in 100% Purity percent | 0 | 57 | 55 | 43 | <0.2 |

Figure 2:
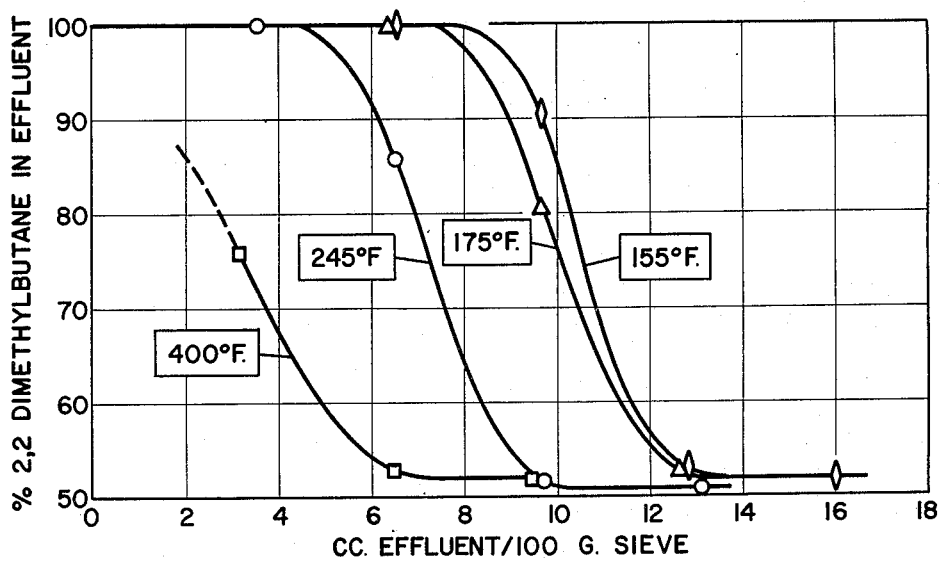

These results clearly demonstrate the selective nature of the zeolite in separating singly branched from doubly branched hydrocarbon isomers. The results are further shown graphically in Figure 2.

EXAMPLE 2

A mixture of 50% 2,3-dimethyl butane and 50% 3-methyl pentane was treated as in Example 1 at 155° and 175° F. The quantity of 100% pure 2,3-dimethyl butane effluent amounted to 2.2 cc. per 100 grams of adsorbent at each of these temperatures.

EXAMPLE 3

A mixture consisting of 20% of 3-methyl pentane and 80% 2,3-dimethyl butane was treated similarly as in Example 1 at 175° F. The yield was 4.5 cc. of pure 2,3-dimethyl butane effluent per 100 grams zeolite.

EXAMPLE 4

A synthetic crystalline sodium alumino-silicate of the type described hitherto, and having a pore diameter of 13 Angstroms, was employed in separating the mixture of Example 3 in the manner detailed in connection with Figure 1. Feed was passed through the bed until 3-methyl pentane appeared in the effluent. Feed was then interrupted, the purified 2,3-dimethyl butane segregated, and the zeolite desorbed with propylene at 175° F. The reactivated zeolite was then further employed for separating the mixed isomer feed with the same result as the fresh adsorbent.

EXAMPLE 5

Separation tests were also made with the zeolite in more complex systems. A five-component $C_6$ mixture containing 20% each of 2,2-dimethyl butane, 2-methyl pentane, n-hexane, methyl cyclopentane and cyclohexane. A temperature of 175° F. at atmospheric pressure was maintained. The 2,2-dimethyl butane was again the least strongly adsorbed component, and 55% of the quantity fed appeared first in the effluent in 100% concentration. The 3-methyl pentane appeared next in the effluent, so that at 93% 2,2-dimethyl butane purity, 66% of the dimethyl butane had been recovered.

An important physical relationship and characteristic of a system for separating close boiling components in a mixture is the alpha value. These adsorption coefficients are obtained by passing a binary mixture in the vapor phase over the adsorbent until several volumes of effluent are collected having the same composition as the feed; the adsorbed fraction is then recovered by suitable means, such as steam desorption. The alpha values are calculated as follows:

$$\text{Alpha}(\alpha) = \frac{\text{Percent component A (vapor)} \times \text{percent component B (adsorbed)}}{\text{Percent component B (vapor)} \times \text{percent component A (adsorbed)}}$$

Written in another way, $$\alpha = \frac{(N_1/N_2)^A}{(N_1/N_2)^V}$$

where $N_1$ and $N_2$ refer respectively to the mol fractions of components 1 and 2, component 1 being preferentially adsorbed. The superscripts A and V refer to the adsorbed and unadsorbed vapor phases, respectively.

The significance of the alpha values can best be understood by relating them to the number of theoretical stages of separation required to produce, from a binary mixture, one of the components in a given degree of purity. This relationship is expressed in the following equation:

$$\log\left(\frac{N_1}{N_2}\right)\text{product} - \log\left(\frac{N_1}{N_2}\right)\text{feed} = n(\log \alpha)$$

Figure 3:
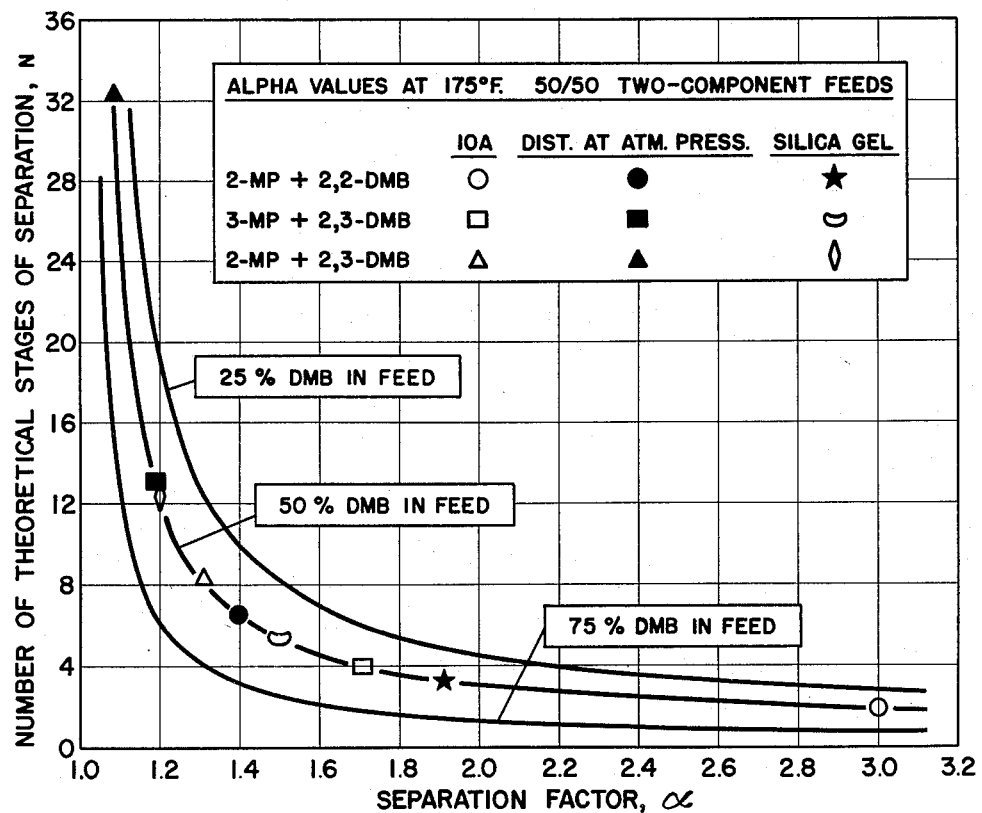

Here, $n$, the number of theoretical plates may be considered analogous to the number of theoretical plates in a distillation column, and Figure 3 relates the number of theoretical stages of separation to the alpha value. The three lines represent different feed compositions. From this correlation it is evident that changes in the alpha value have an increasingly greater significance as the alpha value approaches unity. At unity, of course, the stages required would be infinite and no separation could be achieved. As the alpha increases to values greater than one, the number of theoretical stages rapidly decreases and above about 2.0 to 2.5 the required theoretical stages do not further significantly decrease. Thus, the significant range of alpha values for use in separating the isomeric hexanes will lie within the approximate range of 1.2 to 2.0 or higher.

The following tabulation summarizes alpha values determined for various two-component mixtures of (a) isohexanes, (b) cyclohexanes, and (c) cycloparaffin-n-paraffin mixtures using typical alumino-silicate adsorbents. Similar data obtained with activated char and silica gel are included for comparison.

*Determination of adsorption coefficients (alpha values) for binary mixtures*

[Fixed-bed, vapor phase adsorption at atmospheric pressure and 175° F.]

| Test No. | Adsorbent | Feed Composition | Alpha Value | Theoretical Stages Required To Produce 90% DMB |
|---|---|---|---|---|
| 1 | 13A Sieve | 50% 2-MP; 50% 2,2-DMB | 3.76 | 1+ |
| 2 | 13A Sieve—Ca Form | | 3.00 | 2 |
| 3 | Activated Char | | 1.70 | 4 |
| 4 | Silica Gel | | 1.94 | 3 |
| | Distillation | | 1.40 | 6+ |
| 5 | 13A Sieve | 50% 3-MP; 50% 2,3-DMB | 1.56 | 5+ |
| 6 | 13A Sieve—Ca Form | | 1.70 | 4 |
| 7 | Activated Char | | 1.50 | 5 |
| 8 | Silica Gel | | 1.50 | 5 |
| | Distillation | | 1.18 | 12 |
| 9 | 13A Sieve | 50% 2-MP; 50% 2,3-DMB | 1.21 | 12 |
| 10 | 13A Sieve—Ca Form | | 1.29 | 8 |
| 11 | 13A Sieve—Zn Form | | 1.50 | 5 |
| 12 | 13A Sieve—Ba Form | | 1.51 | 5 |
| 13 | Activated Char | | 1.10 | 32 |
| 14 | Silica Gel | | 1.18 | 12 |
| | Distillation | | 1.07 | 32 |
| 15 | 13A Sieve | 50% 3-MP; 50% 2,2-DMB | 3.54 | 2 |
| 16 | 13A Sieve—Ca Form | | 2.67 | 2+ |
| 17 | 13A Sieve | 50% MCP; 50% n-C₆ | [1] 1.11 | |
| 18 | 13A Sieve—Ca Form | | [2] 1.17 | |

[1] MCP preferentially adsorbed.
[2] n-C₆ preferentially adsorbed.

These data show for each isohexane mixture much higher alpha values (less theoretical stages) for the alumino-sicilate adsorbents than for distillation. Also, one or more of the sieve forms shows for each mixture higher alpha values than in the case of activated char or silica gel. In the separation of 2-methyl pentane from 2,3-dimethyl butane where the difference in boiling point is only 5° F. (Tests 9–14), the differences in separation factor are highly significant. For example, the zinc and barium alumino-silicates require only five theoretical stages for the separation indicated as compared to 32 required for distillation and activated char and 12 for silica gel adsorption.

The temperature at which the adsorption is made has a very pronounced effect on the alpha values obtained with 13A sodium alumino-silicate but very little, if any, on those for activated char and silica gel. Summarized data are shown in the following tabulation:

*Effect of temperature on alpha value*

[Feed: 50/50 2-MP; 2,2-DMB; pressure: Atm.]

| Adsorbent | Adsorption Temperature | |
|---|---|---|
| | 175° F. | 245° F. |
| Sodium Alumino-Silicate | 3.76 | 2.70 |
| Activated Char | 1.70 | 1.70 |
| Silica Gel | 1.94 | 1.86 |

The separation factors (alpha values) for various metallo-alumino-silicates are also influenced by the water content of the adsorbent, as illustrated by the following data for isohexane separation.

*Effect of water content of adsorbent on alpha value*

[Vapor phase adsorption at atmospheric pressure and 175° F.]

| Test No. | Adsorbent | Water Content, Wt. percent[1] | Feed Composition | Alpha Value |
|---|---|---|---|---|
| 19 | 13A Sieve | 0.0 | 50% 3-MP; 50% 2,2-DMB | 3.13 |
| 20 | 13A Sieve | 0.72 | 50% 3-MP; 50% 2,2-DMB | 3.54 |
| 21 | 13A Sieve—Ca Form | 0.33 | 50% 2-MP; 50% 2,3-DMB | 1.13 |
| 22 | 13A Sieve—Ca Form | 2.40 | 50% 2-MP; 50% 2,3-DMB | 1.30 |
| 23 | 13A Sieve—Ca Form | 2.40 | 50% 2-MP; 50% 2,3-DMB | 1.29 |
| 24 | 13A Sieve—Zn Form | 14.3 | 50% 2-MP; 50% 2,3-DMB | 1.35 |
| 25 | 13A Sieve—Zn Form | 7.3 | 50% 2-MP; 50% 2,3-DMB | 1.50 |

[1] Determined as ignition loss at 1600° F. for one-half hour.

The quantity of water on the adsorbent may conveniently be controlled as part of or during the reactivation or desorption cycle. For example, water may be added to the purge gas or, if the adsorbent is steamed during the reactivation cycle, the optimum water retention may be attained by temperature or rate control of the relatively dry purge gas.

Though the process of the present invention has general application to separating close boiling hydrocarbons and particularly singly branched from multi-branched and cyclic hydrocarbons, the process has particular application as noted above to isomerization reactions. In this, the zeolites having specificity for the singly branched over the multi-branched hydrocarbons may be used either alone or in conjunction with other zeolites, hitherto described, having pore diameters of about 5 Angstroms. These absorb straight chain paraffins and olefins but exclude branched chain paraffins. Thus in one particular sequence of steps, a straight run naphtha fraction may be passed through a 5 Angstrom zeolite bed wherein the normal pentane and hexane are removed. The unadsorbed fraction or raffinate consisting of isoparaffins and naphthenes may then be passed to the 13 Angstrom zeolite bed. The straight chain hydrocarbons are then passed to an isomerization zone, the isomerizate recycled to the 5 Angstrom zeolite bed and the raffinate added to the stream passing to the 13 Angstrom zeolite bed. The unadsorbed fraction, or raffinate, from the 13 Angstrom zeolite bed is substantially dimethyl butanes with some isopentane. The methyl pentanes which are adsorbed on the 13 Angstrom zeolite are then desorbed and recycled to the isomerizaiton zone for further conversion to the higher octane dimethyl butanes.

In another sequence, the $C_5$–$C_6$ hydrocarbon fraction boiling approximately within the range of 120° to 180° F. may be first mildly hydroformed in a conventional manner under conditions which substantially completely convert cycloparaffins to benzene. On distillation, an overhead cut consisting of normal and isopentanes and hexanes may be isomerized to a product containing dimethyl butanes which are separated from the less branched isomers in accordance with the process described above. These dimethyl butanes may be combined with the benzene from the hydroformate distillation to produce a high octane composite for use as such or blending with other fuels. The normal hexane and methyl pentanes from the adsorption-separation step may then be recycled to the isomerization zone.

Though a fixed bed process has been described, the process of the present invention may also be employed in conjunction with a moving bed or a fluidized solids type of operation. The moving bed type of contacting is particularly adapted to the adsorption-desorption cycles of this type of separation of singly branched from doubly branched paraffins; the desorbed methyl pentanes are particularly suited for stripping dimethyl butanes from the adsorbent, particularly in the lower section of an adsorption zone employing such a movable bed.

What is claimed is:

1. An improved process for separating singly branched from more highly branched chain and cyclic hydrocarbons which comprises contacting a mixture of said hydrocarbons with a crystalline metallic alumino-silicate adsorbent having a uniform pore opening of about 6 to 15 Angstrom units at a temperature of about 150° to 500° F. in an adsorption zone, selectively adsorbing said singly branched hydrocarbon, and withdrawing a stream substantially poorer in said singly branched hydrocarbon from said zone.

2. The process of claim 1 wherein a product rich in said singly branched hydrocarbon is recovered from said adsorbent.

3. The process of claim 1 wherein said adsorbent has a uniform pore diameter of 10 to 13 Angstroms.

4. An improved process for separating singly branched from doubly branched paraffinic hydrocarbons which comprises passing a vaporized stream comprising said hydrocarbons into an adsorption zone, maintaining in said zone a zeolite having an empirical formula $$\frac{Me_2O}{n} \cdot Al_2O_3 \cdot 2.7SiO_2$$

wherein Me is a metal and $n$ is its valence, said zeolite having a uniform pore size of 10 to 13 Angstroms, withdrawing a stream rich in said doubly branched hydrocarbon from said zone, desorbing said zeolite, and recovering a stream rich in said singly branched hydrocarbon from said desorbate.

5. The process of claim 4 wherein said metal is zinc.

6. The process of claim 4 wherein said metal is calcium.

7. The process of claim 4 wherein said metal is barium.

8. The process of claim 4 wherein said zeolite contains up to about 15% by weight of water.

9. The process of claim 4 wherein said vaporized stream is a $C_5$–$C_6$ stream, said singly branched hydrocarbon methyl pentane, and said doubly branched hydrocarbon dimethyl butane.

10. In a light naphtha isomerization process wherein a light virgin naphtha is isomerized to produce a product stream comprising methyl pentanes and dimethyl butanes, the improvement which comprises passing said stream through a bed of a metallic crystalline aluminosilicate having a uniform pore diameter of 10 to 13 Angstroms, separating a methyl pentane-rich stream from a dimethyl butane rich stream, and passing said methyl pentane-rich stream to said isomerization process.

References Cited in the file of this patent

UNITED STATES PATENTS

| 2,395,022 | Sutton et al. | Feb. 19, 1946 |
| 2,880,254 | Thompson | Mar. 31, 1959 |
| 2,882,244 | Milton | Apr. 14, 1959 |

OTHER REFERENCES

"Petroleum Engineer," Refining Section, p. C–53, February 1957.

"Physical Properties of Linde Molecular Sieves," Form 9947, published by the Linde Company on Aug. 19, 1957.